United States Patent
Nago

(10) Patent No.: US 9,973,029 B2
(45) Date of Patent: May 15, 2018

(54) WIRELESS POWER TRANSMISSION/RECEPTION APPARATUS

(71) Applicant: CANON KABUSHIKI KAISHA, Tokyo (JP)

(72) Inventor: Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 14/899,642

(22) PCT Filed: Jun. 18, 2014

(86) PCT No.: PCT/JP2014/003272
§ 371 (c)(1),
(2) Date: Dec. 18, 2015

(87) PCT Pub. No.: WO2014/208056
PCT Pub. Date: Dec. 31, 2014

(65) Prior Publication Data
US 2016/0149435 A1    May 26, 2016

(30) Foreign Application Priority Data
Jun. 26, 2013  (JP) ................. 2013-133524

(51) Int. Cl.
*H01F 27/42* (2006.01)
*H02J 7/02* (2016.01)
(Continued)

(52) U.S. Cl.
CPC ............ *H02J 7/025* (2013.01); *H02J 7/00* (2013.01); *H02J 17/00* (2013.01); *H02J 50/12* (2016.02);
(Continued)

(58) Field of Classification Search
CPC .. H02J 7/025; H02J 50/80; H02J 50/12; H02J 50/40; H02J 7/00; H02J 17/00; H02J 2007/0096
See application file for complete search history.

(56) References Cited

U.S. PATENT DOCUMENTS

2012/0038220 A1  2/2012  Kim
2013/0130621 A1  5/2013  Kim
(Continued)

FOREIGN PATENT DOCUMENTS

JP  2011-142763 A  7/2011
JP  2011-193619 A  9/2011
(Continued)

OTHER PUBLICATIONS

Wireless Power Consortium, System Description Wireless Power Transfer, vol. 1: Low Power Part 1 Interface Definition Version 1.1.1 pp. 1-247, Jul. 2012.

*Primary Examiner* — Daniel Cavallari
(74) *Attorney, Agent, or Firm* — Canon U.S.A., Inc. IP Division

(57) ABSTRACT

A wireless power transmission apparatus includes a first antenna unit configured to perform wireless power transmission with another apparatus, a communication unit configured to include a second antenna unit which is different from the first antenna unit and perform communication for authentication in the wireless power transmission with the other apparatus using electric power received through the first antenna unit, a load configured to operate using the electric power received through the first antenna unit; and a transformation unit configured to be connected to the first antenna unit and perform impedance transformation. The transformation unit performs impedance transformation in accordance with electric power consumed by the communication unit during the communication for authentication performed by the communication unit and performs imped-
(Continued)

ance transformation in accordance with electric power consumed by the load when the authentication is successfully performed.

11 Claims, 5 Drawing Sheets

(51) Int. Cl.
*H02J 50/40* (2016.01)
*H02J 50/80* (2016.01)
*H02J 50/12* (2016.01)
*H02J 7/00* (2006.01)
*H02J 17/00* (2006.01)

(52) U.S. Cl.
CPC .............. *H02J 50/40* (2016.02); *H02J 50/80* (2016.02); *H02J 2007/0096* (2013.01)

(56) References Cited

U.S. PATENT DOCUMENTS

| | | | |
|---|---|---|---|
| 2014/0184150 A1* | 7/2014 | Walley | H02J 5/005 320/108 |
| 2014/0361628 A1* | 12/2014 | Huang | H01F 38/14 307/104 |

FOREIGN PATENT DOCUMENTS

| | | |
|---|---|---|
| JP | 2012-110154 A | 6/2012 |
| JP | 2012-135127 A | 7/2012 |
| JP | 2013-225961 A | 10/2013 |
| WO | 11/061821 A1 | 5/2011 |

* cited by examiner

WIRELESS POWER TRANSMISSION/RECEPTION APPARATUS

TECHNICAL FIELD

The present invention relates to a wireless power transmission technique.

BACKGROUND ART

Examples of a wireless power transmission technique include a wireless power transmission technique of a magnetic resonance method. In the wireless power transmission technique of the magnetic resonance method, a degree of freedom of arrangement of apparatuses is improved since transmission in a range from several centimeters to 10 centimeters is enabled depending on antennas. Furthermore, when the magnetic resonance method is employed, a single power transmission apparatus may transmit electric power to a plurality of power reception apparatuses. In the magnetic resonance method, electric power is supplied by coupling a resonance circuit included in a power transmission apparatus and a resonance circuit included in a power reception apparatus by resonance of a magnetic field. In order to enhance power transmission efficiency of the magnetic resonance method, appropriate impedance of apparatuses should be obtained. In PTL 1, impedance of a matching circuit (resonance circuit) is controlled in accordance with a distance between a power transmission antenna and a power reception antenna. In PTL 2, an impedance control method of a matching circuit is changed on a power transmission apparatus side in accordance with a determination as to whether a power reception apparatus is capable of performing the impedance control of the matching circuit. In PTL 3, a power transmission apparatus and a power reception apparatus are synchronized with each other and resonance frequencies and impedance are changed so that electric power received by a third party is reduced.

Furthermore, in NPL 1, three states including a start phase, an authentication phase, and a power reception (power transmission) phase are defined in a one-to-one wireless power transmission between apparatuses employing an electromagnetic induction method using an electromagnetic induction phenomenon. In the start phase, power is not transmitted and received between the power transmission apparatus and the power reception apparatus. In the authentication phase, the power transmission apparatus transmits electric power which is smaller than transmission electric power in the power reception (power transmission) phase which will be described below to the power reception apparatus. When each of the power transmission apparatus and the power reception apparatus detects the other of the apparatuses, the authentication phase is entered. In the authentication phase, the power reception apparatus activates a communication unit by supplying the electric power supplied from the power transmission apparatus to the communication unit and performs communication for device authentication with the power transmission apparatus through the communication unit. In the authentication phase, power consumption of the power reception apparatus mainly corresponds to power consumption of the communication unit. When authentication is successfully performed in the authentication phase, the power transmission apparatus and the power reception apparatus enter the power reception (power transmission) phase. In the power reception (power transmission) phase, the power transmission apparatus transmits electric power which is larger than the transmission power in the authentication phase to the power reception apparatus. In the power reception (power transmission) phase, the power reception apparatus supplies the electric power supplied from the power transmission apparatus to a load, and the received power is used for charging a battery, for example. In the power reception (power transmission) phase, the power consumption of the power reception apparatus mainly corresponds to power consumption of the load.

In such one-to-one wireless power transmission between apparatuses, in general, impedance is set so that optimum transmission efficiency is attained in the power reception (power transmission) phase taking a circuit size into consideration, and impedance control for optimizing transmission efficiency in all the phases is not performed.

CITATION LIST

Patent Literature

PTL 1: Japanese Patent Laid-Open No. 2011-142763
PTL 2: Japanese Patent Laid-Open No. 2011-193619
PTL 3: Japanese Patent Laid-Open No. 2012-135127

Non Patent Literature

NPL 1: "System Description Wireless Power Transfer" Volume I. Low Power Part 1: Interface Definition Version 1.1.1 July 2012

SUMMARY OF INVENTION

Technical Problem

It is assumed that a wireless power transmission system having a plurality of phases as disclosed in NPL 1 is applied to a case where a single power transmission apparatus transmits electric power to a plurality of power reception apparatuses. In this case, it is likely that, when the transmission apparatus transmits electric power to a first power reception apparatus in a power reception (power transmission) phase, a user installs a second power reception apparatus in a start phase or an authentication phase in a possible power transmission range of the power transmission apparatus. As described above, power consumption of the first power reception apparatus and power consumption of the second power reception apparatus in the respective phases are different from each other. In this case, the first power reception apparatus in the power reception (power transmission) phase supplies the received power to a load of comparatively low impedance such as a battery. On the other hand, in the second power reception apparatus in the start phase or the authentication phase, electric power is consumed only by a communication unit, and accordingly, power consumption of the second power reception apparatus is smaller than that of the first power reception apparatus. The second power reception apparatus controls impedance so that optimum impedance is obtained in the power reception (power transmission) phase taking a circuit size into consideration as described above. A value of the impedance of the first power reception apparatus and a value of the impedance of the second power reception apparatus become the same as each other when viewed from the power transmission apparatus side, and the electric power transmitted from the power transmission apparatus is shared by the first and second power reception apparatuses half and half. In this case, power consumption of the second power reception apparatus in the authentication phase is small, and therefore, since the power consumption is small relative to the received electric power, small current is supplied. Accordingly, a voltage is increased in a portion of an internal circuit of the second power reception apparatus. For example, in a state in which power consumption of the load of the first power reception apparatus is 5 W and the power transmission apparatus transmits an electric power of 5 W, when the second power reception apparatus is installed, the first and second power reception apparatuses individually receive electric powers of 2.5 W. When the second power reception apparatus in the authentication phase consumes an electric power of 0.5 W, the remaining electric power of 2 W becomes a factor of the increase of the voltage value of the internal circuit. Therefore, it is likely that the apparatus fails if the portion of the internal circuit is constructed by a component having low voltage resistance. As described above, it is likely that, when the technique of one-to-one wireless power transmission such as the technique employed in NPL 1 in which electric power output from the power transmission apparatus and power consumption of the power reception apparatus are different from each other in the individual phases is employed in one-to-many wireless power transmission, unexpected problems arise. For example, when the second power reception apparatus is installed while the power transmission apparatus transmits electric power to the first power reception apparatus, the second power reception apparatus may fail.

Solution to Problem

The present invention provides a wireless power transmission apparatus including a first antenna unit configured to perform wireless power transmission with another apparatus, a communication unit configured to include a second antenna unit which is different from the first antenna unit and perform communication for authentication in the wireless power transmission with the other apparatus using electric power received through the first antenna unit, a load configured to operate using the electric power received through the first antenna unit, and a transformation unit configured to be connected to the first antenna unit and perform impedance transformation. The transformation unit performs impedance transformation in accordance with electric power consumed by the communication unit during the communication for authentication performed by the communication unit and performs impedance transformation in accordance with electric power consumed by the load when the authentication is successfully performed.

Advantageous Effects of Invention

According to the embodiments of this specification, problems which arise in a case where a single power transmission apparatus transmits electric power to a plurality of power reception apparatuses in a wireless power transmission system having a plurality of phases of different power consumptions may be addressed.

Further features of the present invention will become apparent from the following description of exemplary embodiments with reference to the attached drawings.

DESCRIPTION OF EMBODIMENTS

Embodiments described below address problems which arise in a case where a single power transmission apparatus transmits electric power to a plurality of power reception apparatuses in a wireless power transmission system having a plurality of phases of different power consumptions.

First Embodiment

In a first embodiment, a wireless power transmission system including a power transmission apparatus which transmits electric power and a plurality of power reception apparatuses which receive the electric power will be described. In this embodiment, impedance control is performed in order to reduce increase of a voltage to an unexpected range in an internal circuit of a second power reception apparatus which is disposed in a possible power transmission range of the power transmission apparatus which transmits electric power to a first power reception apparatus. The transmission apparatus of this embodiment has a function of simultaneously transmitting electric power to a plurality of power reception apparatuses.

Figure 1:
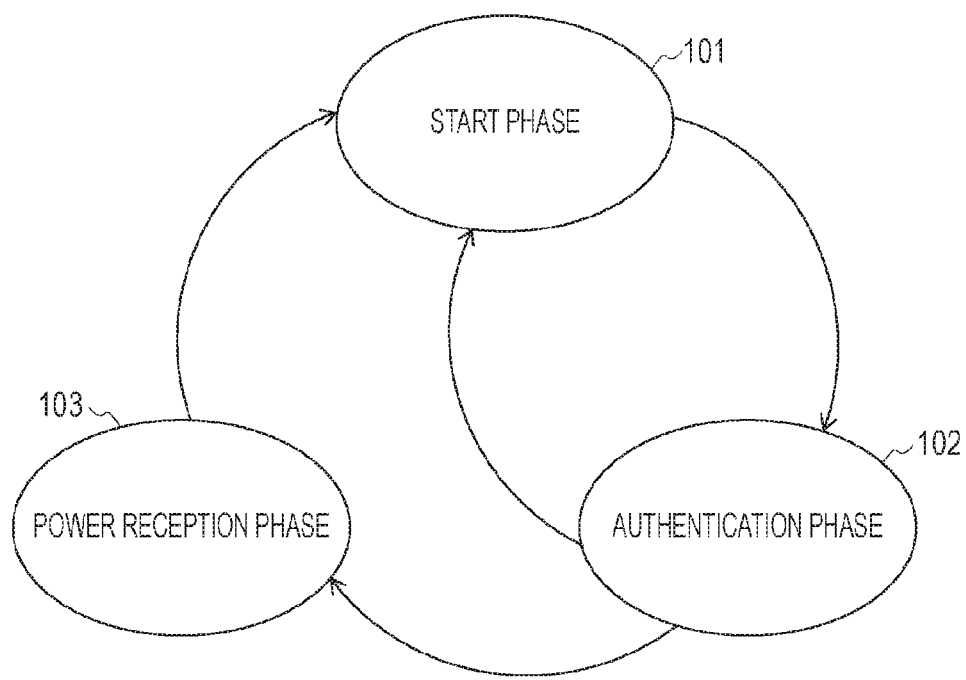
FIG. 1 is a diagram illustrating transition of a state of a power reception apparatus according to a first embodiment.

The wireless power transmission system of this embodiment includes a plurality of phases representing states of wireless power transmission. Transition of a state of a power reception apparatus of this embodiment is illustrated in FIG. 1. In FIG. 1, a reference numeral 101 represents a start phase, a reference numeral 102 represents an authentication phase, and a reference numeral 103 represents a power reception phase. In the start phase, power transmission and reception is not performed between the power transmission apparatus and the power reception apparatus. In the start phase, the power reception apparatus does not supply received electric power to a load of the power reception apparatus itself, and power consumption of the power reception apparatus is little or zero. After detecting electric power supplied from the power transmission apparatus, the power reception apparatus enters the authentication phase. When the power transmission apparatus has not detected any power reception apparatus, the power transmission apparatus periodically radiates electromagnetic waves used to detect a power reception apparatus in the start phase.

In the authentication phase, the power transmission apparatus transmits electric power which is smaller than transmission electric power in the power reception phase which will be described below to the power reception apparatus. In the authentication phase, the power reception apparatus activates a communication unit by supplying the electric power supplied from the power transmission apparatus to the communication unit so as to perform communication for device authentication with the power transmission apparatus through the communication unit. In the authentication phase, the power reception apparatus supplies the received electric power to the communication unit, and power consumption of the power reception apparatus mainly corresponds to power consumption of the communication unit. When authentication is successfully performed in the authentication phase, the power reception apparatus enters the power reception (power transmission) phase. When the authentication fails in the authentication phase, the power reception apparatus returns to the start phase 101.

In the power reception phase, the power transmission apparatus transmits electric power which is larger than the transmission electric power in the authentication phase to the power reception apparatus. In the power reception phase, the power reception apparatus supplies the electric power supplied from the power transmission apparatus to the load, and the received electric power is used for charging a battery, for example. In the power reception phase, the power consumption of the power reception apparatus mainly corresponds to power consumption of the load.

Figure 2:
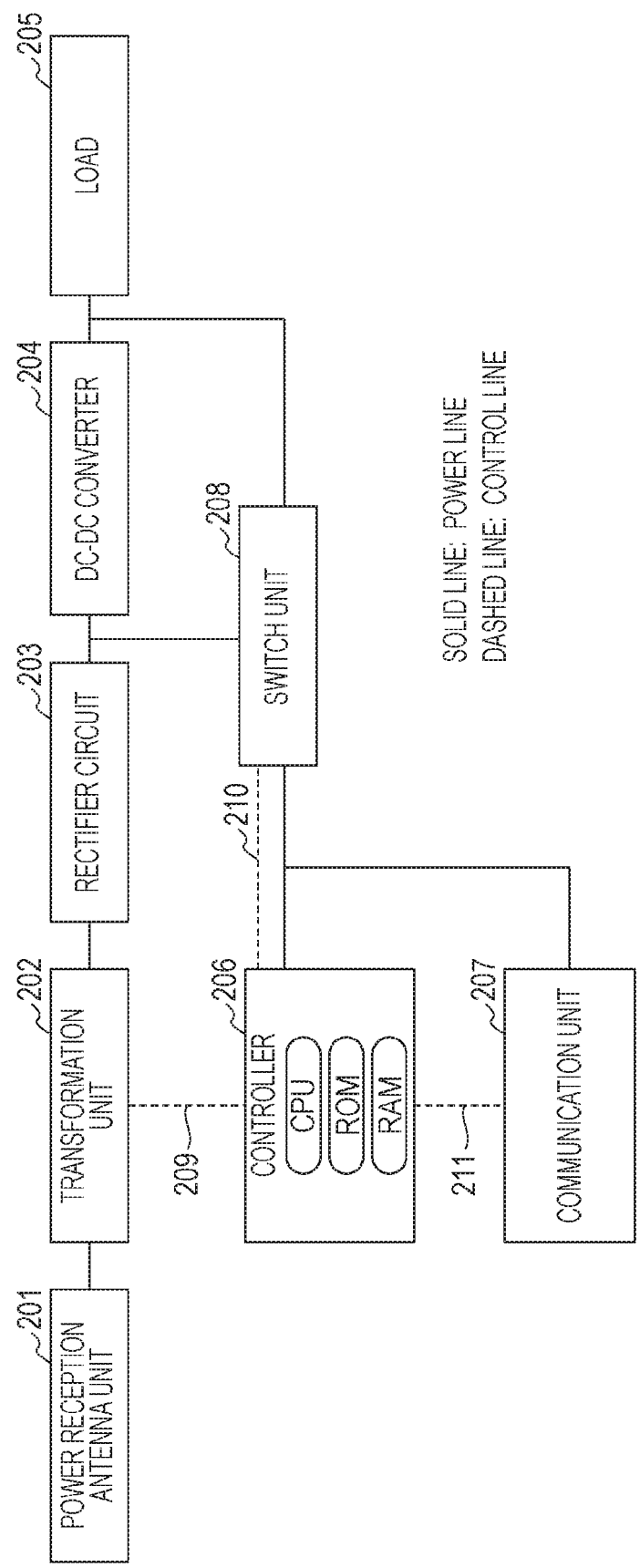
FIG. 2 is a block diagram illustrating the power reception apparatus according to the first embodiment.

Next, a hardware configuration of the power reception apparatus of this embodiment is illustrated in FIG. 2. In FIG. 2, a power reception antenna unit 201 includes an antenna and an element which performs characteristic impedance matching. Note that the power reception antenna unit 201 includes a resonance circuit which resonates in a desired resonance frequency. A transformation unit 202 is used for impedance matching between the power reception antenna unit 201 and a circuit in a subsequent stage. The transformation unit 202 will be described in detail hereinafter with reference to FIG. 4. A rectifier circuit 203 rectifies high-frequency power received by the power reception antenna unit 201 so as to generate direct current. A DC-DC converter 204 is connected to an output of the rectifier circuit 203 and outputs a certain voltage. A load 205 consumes electric power received in the power reception phase. The load 205 may be a battery, for example, which stores received electric power.

A controller 206 controls the entire power reception apparatus. The controller 206 includes a CPU, a ROM, and a RAM. Here, the CPU is an abbreviation for a central processing unit, the RAM is an abbreviation for a random access memory, and the ROM is an abbreviation for a read only memory. The control of the entire power reception apparatus performed by the controller 206 is realized when the CPU reads a control program stored in the ROM into the RAM and executes the control program. Operation of the power reception apparatus according to a flowchart illustrated in FIG. 5 which will be described hereinafter is realized when the controller 206 executes the control program so as to perform control of hardware and operation and processing on information.

A communication unit 207 includes a chip and an antenna which are used to perform transmission and reception of a control signal used to control wireless power transmission with the power transmission apparatus. In this embodiment, the communication unit 207 performs wireless communication based on Bluetooth (registered trademark) 4.0 standard (hereinafter referred to as "BT 4.0"). Furthermore, the communication unit 207 may perform wireless communication based on other communication standards including a wireless LAN (IEEE802.11 series), NFC (Near Field Communication) and the like. The communication unit 207 includes an antenna for the wireless communication which is different from the antenna included in the power reception antenna unit 201.

A switch unit 208 controls power supply to the controller 206 and the communication unit 207. The switch unit 208 performs switching such that electric power is supplied to the controller 206 and the communication unit 207 from an input side of the DC-DC converter 204 (the output of the rectifier circuit 203) in the authentication phase and the electric power is supplied from an output side of the DC-DC converter 204 in the power reception phase. This is because the DC-DC converter 204 does not operate without a certain voltage or more, and electric power is obtained from the input side of the DC-DC converter 204 (an output of the rectifier circuit 203) so that the controller 206 and the communication unit 207 also operate in the authentication phase. A first control signal line 209 is used to transmit a control signal from the controller 206 so that the controller 206 controls the transformation unit 202. A second control signal line 210 is used to transmit a control signal from the controller 206 so that the controller 206 controls the switch unit 208. A communication line 211 is used to transmit a communication signal between the controller 206 and the communication unit 207.

Figure 4:
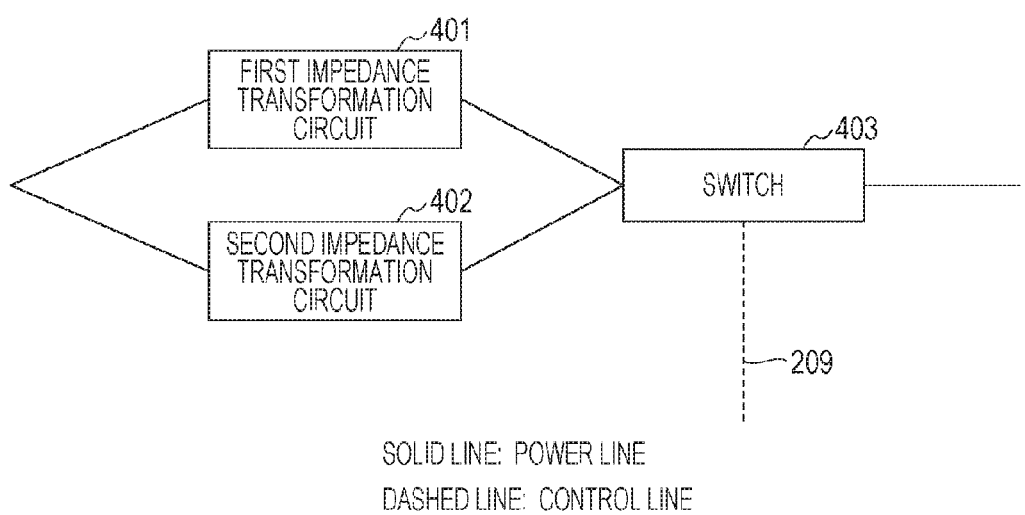
FIG. 4 is a block diagram illustrating an internal configuration of a transformation unit according to the first embodiment.

Subsequently, the transformation unit 202 will be described in detail with reference to FIG. 4. In FIG. 4, a first impedance transformation circuit 401 performs impedance transformation between the power reception antenna unit 201 and the communication unit 207 in the start phase and the authentication phase. The first impedance transformation circuit 401 is designed in accordance with electric power supplied from the power transmission apparatus in the power reception phase and power consumption of the power reception apparatus and voltage resistance of an output of the rectifier circuit 203 in the authentication phase of the power reception phase. For example, a case where the power reception antenna unit 201 is located in a possible power transmission range of the power transmission apparatus which is performing power transmission to another power reception apparatus which performs impedance matching between a power reception antenna and a load of the own apparatus is taken as an example. In this case, the first impedance transformation circuit 401 transforms an impedance value so as to obtain an impedance value which enables reception of only electric power which is sufficient for power consumption of the communication unit 207 and the controller 206 and electric power which only causes voltage rise smaller than voltage resistance of the output of the rectifier circuit 203. A second impedance transformation circuit 402 performs impedance transformation in the power reception phase. The second impedance transformation circuit 402 performs impedance transformation for impedance matching between the load 205 and the power reception antenna unit 201. A switch 403 performs switching in accordance with an instruction issued by the controller 206 on the basis of a determination as to whether an output from the first impedance transformation circuit 401 is supplied to the rectifier circuit 203 or an output from the second impedance transformation circuit 402 is supplied to the rectifier circuit 203.

Figure 5:
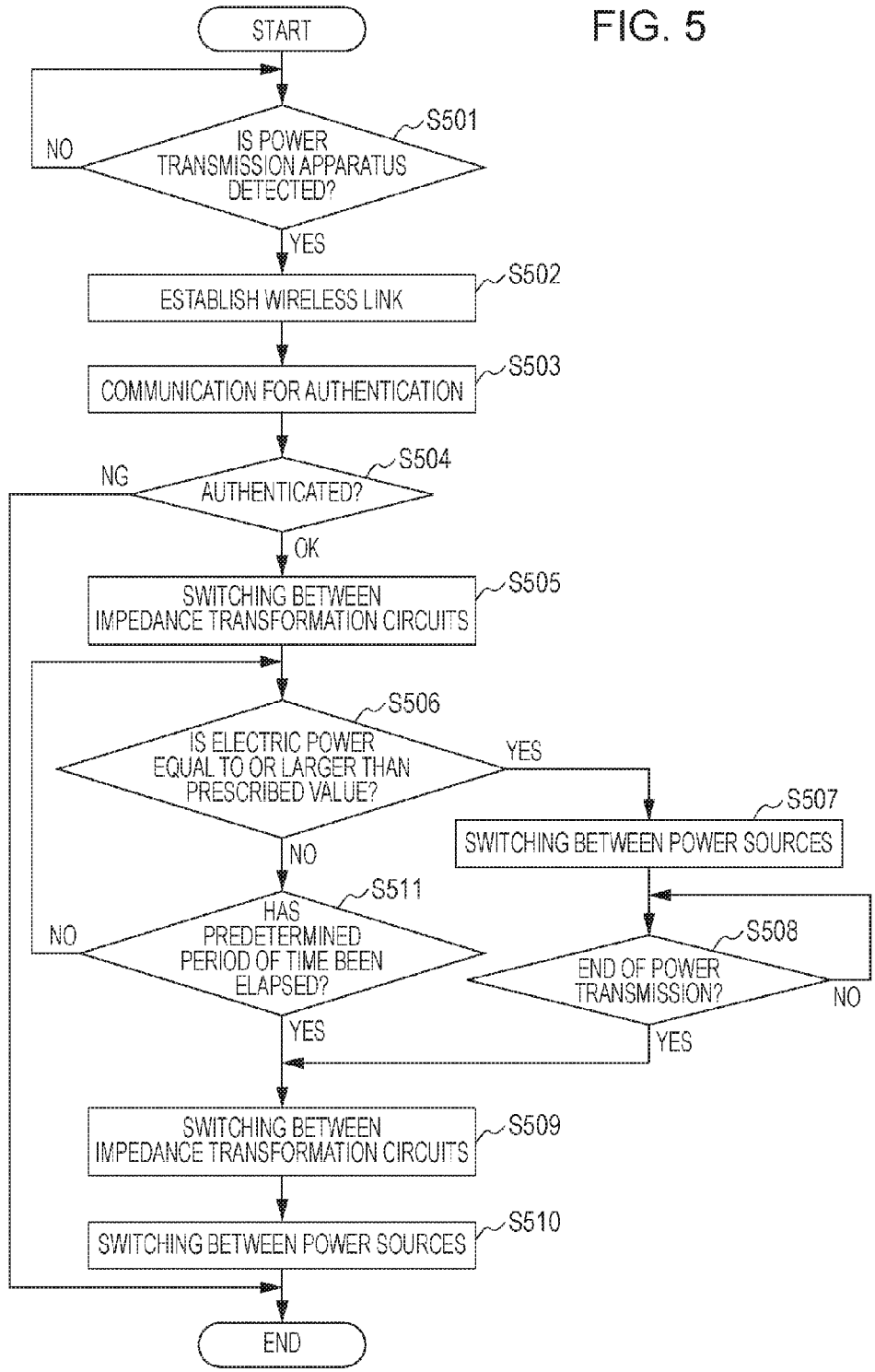
FIG. 5 is a flowchart illustrating operation of the power reception apparatus according to the first embodiment.

A power reception operation performed by the power reception apparatus configured as described above will now be described. FIG. 5 is a flowchart illustrating an operation of the power reception apparatus realized when the controller 206 of the power reception apparatus executes the control program. When the power reception antenna unit 201 detects electric power supplied from the power transmission apparatus in the start phase, the controller 206 starts the power reception operation in accordance with the electric power (S501). A control line 210 is connected to the switch unit 208 so that electric power for the controller 206 and the communication unit 207 is obtained from the input side of the DC-DC converter 204 (the output of the rectifier circuit 203) in the start phase and the authentication phase.

Furthermore, in the start phase and the authentication phase, the first impedance transformation circuit 401 is selected in the transformation unit 202. Accordingly, even if the electric power detected in step S501 is comparatively large electric power which is supplied to another power reception apparatus in the power reception phase, unnecessarily excessive electric power which is larger than the electric power consumed by the controller 206 and the communication unit 207 is not received. Accordingly, rapid rise of the voltage in the portion of the internal circuit is suppressed. It is assumed that, when the power reception apparatus of this embodiment is in the authentication phase, the controller 206 and the communication unit 207 consume an electric power of 0.5 W. Furthermore, it is assumed that, when the power reception apparatus of this embodiment is in the power reception phase, the load consumes an electric power of 5 W. Here, it is assumed that, in a case where, while the power transmission apparatus transmits an electric power of 5 W to a first power reception apparatus, a second power reception apparatus is installed, the first power reception apparatus performs impedance matching between the load and the power reception antenna unit so that power transmission efficiency is improved in the power reception phase. In this case, when the user installs the second power reception apparatus in a possible power transmission range of the power transmission apparatus, power reception is started. In this case, the transformation unit 202 of the second power reception apparatus performs impedance control so that an electric power of 0.5 W is obtained from the electric power of 5 W transmitted by the power transmission apparatus for authentication in the authentication phase. Accordingly, the first power reception apparatus receives an electric power of 4.5 W and the second power reception apparatus receives the electric power of 0.5 W in the electric power of 5 W transmitted from the power transmission apparatus, and therefore, rapid rise of a voltage in a portion of an internal circuit of the second power reception apparatus is suppressed. Furthermore, when the second power reception apparatus newly starts power reception while the first power reception apparatus receives electric power in the power reception phase, the electric power received by the first power reception apparatus is not considerably reduced, and accordingly, deterioration of power reception efficiency is suppressed.

Referring back to FIG. 5, when the controller 206 and the communication unit 207 become available using the electric power transmitted from the power transmission apparatus, the communication unit 207 establishes a wireless link for communication with the power transmission apparatus (S502). The controller 206 performs authentication with the power transmission apparatus through the communication unit 207 after the wireless link is established (S503). In the authentication performed in step S503, for example, information on wireless power transmission standards supported by the power reception apparatus and information on wireless power transmission standards supported by the power transmission apparatus are exchanged between the power reception apparatus and the power transmission apparatus so that a determination as to whether a wireless power transmission standard shared by the power transmission apparatus and the power reception apparatus exists is made. The authentication is performed in accordance with the exchanged information. Furthermore, for example, information on electric power transmittable by the power transmission apparatus and information on electric power receivable by the power reception apparatus are exchanged between the power transmission apparatus and the power reception apparatus no that a determination as to whether electric power transmittable by the power transmission apparatus corresponds to electric power receivable by the power reception apparatus is made. The authentication is performed in accordance with the exchanged information. Furthermore, for example, information on electric power transmitted by the power transmission apparatus and information on electric power received by the power reception apparatus are exchanged for negotiation between the power transmission apparatus and the power reception apparatus, and the authentication is performed in accordance with the exchanged information.

The controller 206 determines whether the authentication is successfully performed by the power transmission apparatus (S504). The determination in step S504 is performed in accordance with a result of a determination as to whether information representing that the authentication is successfully performed transmitted from the power transmission apparatus is received by the controller 206 through the communication unit 207. When it is determined that the authentication fails in step S504, the process is terminated. When the authentication fails, an error notification may be transmitted to the user. When it is determined that the authentication is successfully performed in step S504, the controller 206 issues an instruction for performing switching from the first impedance transformation circuit 401 to the second impedance transformation circuit 402 to the transformation unit 202 through the first control signal line 209. The transformation unit 202 controls the switch 403 no that the connection to the first impedance transformation circuit 401 is switched to connection to the second impedance transformation circuit 402 (S505). When the authentication is successfully performed, the power reception apparatus enters the power reception phase.

The controller 206 monitors an input voltage of the DC-DC converter 204 and determines whether the electric power supplied from the power transmission apparatus exceeds a prescribed value for operation of the DC-DC converter 204 (S506). When determining that the electric power does not exceed the prescribed value in step S506, the controller 206 determines whether a period of time elapsed after the authentication is successfully performed in step S504 exceeds a predetermined value (S511). The elapsed period of time in step S511 may be measured by setting a time point when the impedance circuits are switched from one to another in step S505 as a starting point. When the elapsed period of time exceeds the predetermined value in step S511, it is estimated that the power transmission apparatus does not transmit electric power to the power reception apparatus due to some sort of error. Accordingly, when transmission of electric power is not started after a predetermined period of time (Yes in step S511), the process proceeds to step S509, which will be described hereinafter, where a process for entering the start phase is performed. When the elapsed period of time exceeds the predetermined value in step S511, an error state in which power transmission is not started may be notified. When the elapsed period of time does not exceed the predetermined value, the process in step S506 is performed again.

When it is determined that the electric power exceeds the prescribed value in step S506, the controller 206 issues an instruction for changing a power source of the controller 206 and the communication unit 207 to the switch unit 208 through the second control signal line 210 (S507). The switch unit 208 changes connection such that electric power for the controller 206 and the communication unit 207 is obtained from the output side of the DC-DC converter 204 in accordance with the instruction issued by the controller 206. Furthermore, the switch unit 208 changes connection such that an output from the DC-DC converter 204 is supplied to the load 205. The electric power received in the power reception phase is supplied to the load 205. The load 205 operates using the supplied electric power. If the load 205 is a battery, for example, the load 205 performs a charging operation of storing the supplied electric power.

Subsequently, the controller 206 determines whether the power transmission performed by the power transmission apparatus is to be terminated (S508). The controller 206 performs the determination by monitoring the input voltage of the DC-DC converter 204 and determining whether the voltage is lower than the prescribed value. The determination in step S508 may be performed in accordance with a determination as to whether information representing termination of power transmission is supplied through the communication unit 207. Furthermore, if the load 205 is a battery, it may be determined that the power transmission is to be terminated when full charge is performed. When it is determined that the power transmission is to be terminated, the controller 206 issues an instruction for performing switching from the second impedance transformation circuit 402 to the first impedance transformation circuit 401 to the transformation unit 202 through the first control signal line 209. The transformation unit 202 controls the switch 403 so that the connection to the second impedance transformation circuit 402 is switched to connection to the first impedance transformation circuit 401 (S509). Then the controller 206 issues an instruction for changing power source for the controller 206 and the communication unit 207 to the switch unit 208 through the second control signal line 210 (S510). The switch unit 208 changes connection such that electric power for the controller 206 and the communication unit 207 is obtained from the input side of the DC-DC converter 204 in accordance with the instruction issued by the controller 206. Furthermore, the switch unit 208 changes connection so that an output from the DC-DC converter 204 is not supplied to the load 205.

As described above, the power reception apparatus of this embodiment is provided on the assumption that the power reception apparatus includes the antenna unit used for wireless power transmission with another apparatus and a communication unit which performs communication to perform authentication with the other apparatus in the wireless power transmission using electric power received through the antenna. Furthermore, the power reception apparatus includes the transformation unit which is connected to the antenna unit and which performs impedance transformation. The impedance transformation is performed by the transformation unit so that the apparatus does not fail in the plurality of phases of different power consumptions in the power reception process performed by the power reception apparatus. The transformation unit performs the impedance transformation in accordance with the electric power consumed by the communication unit during communication for the authentication performed by the communication unit. When the authentication is successfully performed, the impedance transformation is performed in accordance with the electric power consumed by the load.

With this configuration, even if the power reception apparatus in the authentication phase is installed in the possible power transmission range of the power transmission apparatus which transmits electric power larger than power consumption in the authentication phase, rapid rise of a voltage in the portion of the internal circuit is suppressed.

Second Embodiment

The power reception apparatus of the first embodiment is configured such that the electric power for the controller 206 and the communication unit 207 is obtained from the input side of the DC-DC converter 204 (the output of the rectifier circuit 203) in the authentication phase. This is because it is presumed that the DC-DC converter 204 does not operate without input electric power of a prescribed value. However, if the DC-DC converter 204 performs output by any voltage, the electric power for the controller 206 and the communication unit 207 may not obtained from the input side of the DC-DC converter 204. In a second embodiment, a case where electric power for a circuit operating in an authentication phase is obtained from an output side of a DC-DC converter 204 will be described.

Figure 3:
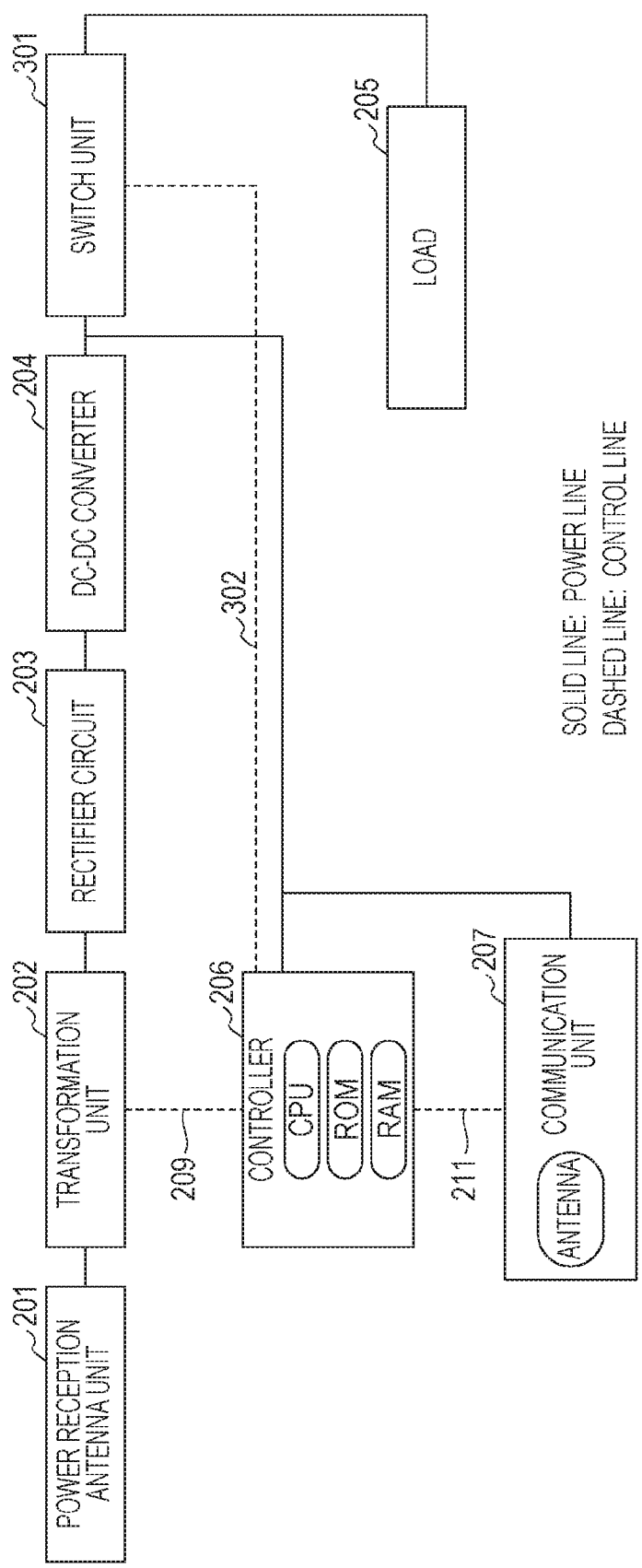
FIG. 3 is a block diagram illustrating a power reception apparatus according to a second embodiment.

FIG. 3 is a diagram illustrating a hardware configuration of a power reception apparatus of this embodiment. Components the same as those of FIG. 2 are denoted by reference numerals the same as those of FIG. 2. Portions different from the first embodiment will be described. The power reception apparatus of the second embodiment includes a switch unit 301 which controls power supply to a load. A controller 206 includes a control line 302 used to transmit a control signal for controlling the switch unit 301. Furthermore, electric power for a controller 206 and a communication unit 207 is obtained from an output side of a DC-DC converter 204. The power reception apparatus of this embodiment does not perform power supply to a load 205 in an authentication phase, and controls the switch unit 301 so that electric power is supplied to the load 205 in a power reception phase. Other operations are the same as those of the first embodiment. With this configuration, an effect which is equivalent to the effect of the first embodiment may be obtained, and in addition, the electric power for the controller 206 and the communication unit 207 may not obtained from an input side of the DC-DC converter 204.

Other Embodiments

The present invention is also realized by executing the following process. Specifically, software (programs) which realizes the functions of the foregoing embodiments is supplied to a system or an apparatus through a network or various storage media, and a computer (or a CPU, an MPU, or the like) of the system or the apparatus reads and executes the programs.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133524, filed Jun. 26, 2013, which is hereby incorporated by reference herein in its entirety.

The invention claimed is:

1. A wireless power transmission apparatus comprising:
   a first antenna unit configured to perform wireless power transmission with another apparatus;
   a communication unit configured to include a second antenna unit which is different from the first antenna unit and perform communication for authentication in the wireless power transmission with the other apparatus using electric power received through the first antenna unit;
   a load configured to operate using the electric power received through the first antenna unit; and
   a transformation unit configured to be connected to the first antenna unit and perform impedance transformation,
   wherein the transformation unit performs impedance transformation in accordance with electric power consumed by the communication unit during the communication for authentication performed by the communication unit and performs impedance transformation in accordance with electric power consumed by the load when the authentication is successfully performed.

2. The wireless power transmission apparatus according to claim 1 further comprising:
   a switching unit configured to perform switching in accordance with a result of a determination as to whether the electric power received through the first antenna unit is to be supplied to the load,
   wherein the switching unit does not supply the electric power received through the first antenna unit to the load during the communication for authentication performed by the communication unit and supplies the electric power received through the first antenna unit to the load when the authentication is successfully performed.

3. The wireless power transmission apparatus according to claim 1, wherein
   the transformation unit performs impedance transformation by switching connections between a plurality of impedance transformation circuits and the first antenna unit from one to another.

4. The wireless power transmission apparatus according to claim 1, wherein
   power consumption of the load is larger than power consumption of the communication unit.

5. The wireless power transmission apparatus according to claim 1, wherein
   the load includes a battery which stores the electric power received through the first antenna unit.

6. A method for controlling a wireless power transmission apparatus including a first antenna unit configured to perform wireless power transmission with another apparatus, a communication unit configured to include a second antenna unit which is different from the first antenna unit and perform communication for authentication in the wireless power transmission with the other apparatus using electric power received through the first antenna unit, a load configured to operate using the electric power received through the first antenna unit, and a transformation unit configured to be connected to the first antenna unit and perform impedance transformation, the method comprising:
   a control step of controlling the transformation unit such that impedance transformation is performed in accordance with electric power consumed by the communication unit during the communication for authentication performed by the communication unit and impedance transformation is performed in accordance with electric power consumed by the load when the authentication is successfully performed.

7. The method for controlling the wireless power transmission apparatus according to claim 6, further comprising:
   a switching step of performing switching in accordance with a result of a determination as to whether the electric power received through the first antenna unit is to be supplied to the load,
   wherein, in the switching step, the electric power received through the first antenna unit is not supplied to the load during the communication for authentication performed by the communication unit and the electric power received through the first antenna unit is supplied to the load when the authentication is successfully performed.

8. The method for controlling the wireless power transmission apparatus according to claim 6, wherein
   the transformation unit performs impedance transformation by switching connections between a plurality of impedance transformation circuits and the first antenna unit from one to another.

9. The method for controlling the wireless power transmission apparatus according to claim 6, wherein
   power consumption of the load is larger than power consumption of the communication unit.

10. The method for controlling the wireless power transmission apparatus according to claim 6, wherein
    the load includes a battery which stores the electric power received through the first antenna unit.

11. One or more computer-readable media storing instructions that, when executed by one or more computing devices, cause the one or more computing devices to execute operations comprising:
    control a first antenna unit to perform wireless power transmission with an other apparatus, wherein a load is configured to operate using electric power received through the first antenna unit;
    control a communication unit, which includes a second antenna unit that is different from the first antenna unit, to perform communication for authentication in the wireless power transmission with the other apparatus using the electric power received through the first antenna unit; and
    control a transformation unit, which is configured to be connected to the first antenna unit, to perform impedance transformation in accordance with electric power consumed by the communication unit during the communication for authentication performed by the communication unit and to perform impedance transformation in accordance with electric power consumed by the load when the authentication is successfully performed.

* * * * *